March 24, 1942.   C. A. RUESENBERG   2,277,610
FRICTION CLUTCH
Filed Sept. 15, 1939
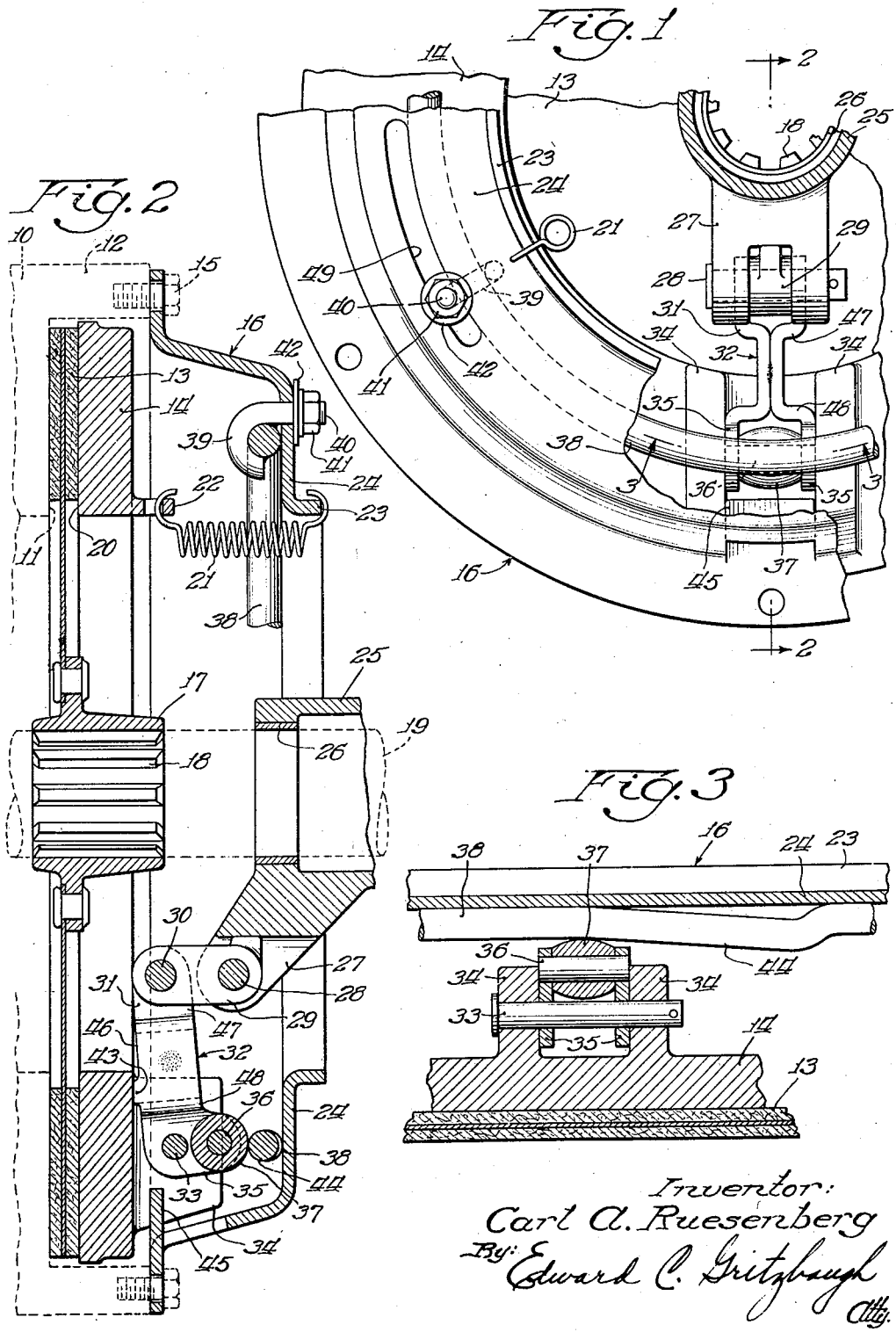
Inventor:
Carl A. Ruesenberg
By Edward C. Gritzbaugh
Atty.

Patented Mar. 24, 1942

2,277,610

UNITED STATES PATENT OFFICE 2,277,610

FRICTION CLUTCH

Carl A. Ruesenberg, Rockford, Ill., assignor to Borg-Warner Corporation, Chicago, Ill., a corporation of Illinois Application September 15, 1939, Serial No. 294,982

6 Claims. (Cl. 192—68)

This invention relates to friction clutches of the type wherein clutch engagement is developed by an oscillating cam acting between the pressure plate and the cover of the clutch, as in the pending application of myself and Joseph Patkus, Serial No. 272,092, filed May 6, 1939, for Friction clutch. The present application constitutes an improvement on the clutch shown in that application, and has as its general object to provide an improved arrangement of clutch operating cam mechanism and adjusting means therefor.

Another object of the invention is to provide in a clutch of the type specified, improved and simplified mechanism for adjusting the clutch operating mechanism.

Another object of the invention is to provide an improved cam lever construction for such a clutch.

Another object of the invention is to provide a clutch which is adapted to be locked in engagement. This is accomplished by providing for an overcenter action in the cam mechanism which effects engagement of the clutch, sufficient to resist the pull of retractor springs which are provided for retracting the pressure plate for disengagement of the clutch.

Other objects, the advantages and uses of my invention will become apparent from a reading of the following specification taken in connection with the appended drawing which forms a part thereof and wherein:

Fig. 1 is a rear elevation of a portion of a clutch embodying the invention, parts being broken away and shown in section to better illustrate the construction;

Fig. 2 is an axial sectional view of the same taken as indicated by the line 2—2 of Fig. 1; and Fig. 3 is a detailed sectional view of the operating and adjusting mechanism, taken as indicated by the line 3—3 of Fig. 1.

As an example of one form in which the invention may be embodied, I have shown in the drawing a clutch embodying a flywheel 10 having a friction face 11 and an axially extending flange 12 defining a space wherein the driven plate 13 and pressure plate 14 are received. The driven plate 13 has a hub portion 17 which is splined as at 18 upon the driven shaft 19, and is adapted to be engaged between the face 11 of the flywheel and the friction face 20 of the pressure plate 14. Secured to the flange 12 as by means of bolts 15, is a cover 16 which forms, together with the flywheel 10, a housing in which the operating parts are mounted.

The pressure plate 14 is normally urged away from clutching engagement with the driven plate 13, by means of retractor springs 21, the respective ends of which are attached to ears 22 on the pressure plate 14, and a rearwardly extending flange 23 on the rear wall 24 of the cover 16.

Clutch engagement is effected by a suitable pressure spring (not shown) acting against a sleeve 25 through which the driven shaft 19 extends. A suitable bearing bushing 26 may be interposed between the sleeve 25 and the shaft 19 so as to allow the shaft 19 to rotate within the sleeve.

Radiating from the sleeve 25 in a plurality of directions equidistantly spaced from each other, are a series of pairs of ears 27. Between each pair of ears 27, is pivoted on a pin 28, one end of a pressure transmitting link 29, the other end of which is pivoted, on a pin 30, between the furcations 31 of an operating lever 32.

Each operating lever 32 is pivoted, on a pin 33, between a pair of lugs 34 formed integrally with and projecting rearwardly from the pressure plate 14. Each lever has a rearwardly extending arm in the form of a pair of furcations 35 between which is journalled, on a pin 36, a barrel-shaped roller 37.

The rollers 37 bear against a ring 38 mounted on the rear wall 24 of the cover 16 by means of a series of hooks 39 each having a threaded shank 40 extended through the wall 24 and provided with a nut 41 threaded thereon and engaging the wall 24 through the medium of suitable bearing means such as the washers 42. The hooks 39 are secured as by welding to the ring 38, and extend through arcuate slots 49 in the wall 24 of the cover. The slots 49 allow the required amplitude of oscillation of the ring 38 to shift position with respect to the rollers 37 from one end to the other of the abutment regions 44.

The axes of the fulcrum pin 33 of the lever 32, the journal pin 36 of the roller 37, and the ring 38, are so related to each other that the roller axis may swing from a position radially outwardly of the line joining the other two axes, in which position the clutch is disengaged, to a position between and aligned with the other two axes, in which latter position the clutch is engaged. The coaction of the lever 32 and the abutment ring 38, as the roller 37 moves between the axes of the pin 33 and ring 38, is in the nature of a toggle action, the roller 37 rolling against the ring 38 and tending to spread the pin 33 and ring 38 apart. This results in the moving of the pressure plate 14 into clutching engagement with the driven plate 13.

The parts are preferably arranged so that the roller 37 may move slightly past the center line joining the pin 33 and ring 38, so as to lock the clutch in engaged position. The lever 32 is provided with a stop 43 adapted to engage the rear face of the pressure plate 14 so as to limit the movement of the roller 37 to a position just slightly past dead center, in which position the clutch remains engaged.

In order to compensate for wearing down of the friction facings of the driven element 13, the abutment ring 38 is provided with inclined abutment regions 44 which may be adjusted to various positions with respect to the rollers 37 so as to vary the effective height of the abutment member relative to the cover wall 24. Such adjustment may be accomplished by loosening the nuts 41, oscillating the ring 38 to a desired position, and then tightening the nuts to secure the ring in its adjusted position. In doing so, the nuts function as knobs by means of which the ring is manipulated.

The ring 38 is formed of a spring steel rod, its ends electric welded, and struck by a die to form the abutment regions 44. It has a tendency to deflect under load, just sufficiently to compensate for any possible misalignment of the rollers 37, and develops a certain amount of spring pressure which gives it longer life between adjustments.

Clutch engagement and release may be effected by a suitable release fork (not shown), cooperating with the sleeve 25 to move the latter axially in either direction. Such a release fork is shown in the pending application identified above, and may be operated by any suitable operating mechanism such as a foot lever.

A driving connection between the cover 16 and the pressure plate 14 is provided in the form of a lug 45 upstruck from the cover 16 and extending between the lugs 34 of the pressure plate.

The levers 32 are of simplified and improved construction, in that they are die-formed from flat plate stock, each lever comprising a pair of symmetrical, opposed sections including the intermediate regions 46, spot welded together, and the bifurcated end regions 31 and 35 respectively, which are formed by offsetting laterally, as at 47 and 48 respectively. The stop lug 43 is formed in the blanking of the sections.

The invention retains the advantages of the cam operating mechanism of its general type disclosed in the above identified pending application, and provides the additional advantages of reduction in expense and simplification which is brought about by incorporating the adjusting means in the abutment ring. Since an abutment ring of hard material is desirable, in any event, considerable saving is effected by employing the abutment ring as the adjusting member. It makes it possible to eliminate the threaded connection between the adjusting member and cover, disclosed in the prior application above identified, and makes it possible to employ a relatively inexpensive stamped sheet metal cover.

The invention further provides for an over-center locking action of the operating cam mechanism, whereby it is possible, if desired, to incorporate the invention in a clutch which is both engaged and released by pedal pressure. A clutch of this type has the advantages that it is not necessary to maintain foot pressure against the pedal in order to hold the clutch released. In the conventional clutch, the clutch is retained in engaged position by spring pressure, and in order to hold it in released position, continuous pressure must be exerted against the operating or control mechanism in order to relieve the clutch of the load of the spring.

The barrel shape of the roller 37 gives a point contact against the abutment ring 38, and allows the roller to adapt itself to the inclined portion 44 without the necessity for maintaining close accuracy of machining in order that the engaging surfaces may properly fit.

The roller 37 and arm 35 of the lever 32 in effect constitute a cam device, and are so referred to in the claims appended hereto. The function of the roller 37 is to eliminate any sliding action between the cam member and the abutment member, and to substitute therefor a purely rolling movement. The effect, however, is the same as though the roller 37 were an integral cam portion of the lever, with the exception of the reduction in friction.

The camming action is facilitated by the rounded surface of the abutment ring 38. In the prior application above referred to, the abutment surface is flat. The employment of a rounded abutment surface makes it possible to secure the same amount of spreading movement with a smaller amplitude of swing of the operating lever.

I claim:

1. In a friction clutch, a driving element, a cover attached thereto, a pressure plate, a driven element arranged to be engaged between the driving element and the pressure plate, a bell crank lever pivoted on the pressure plate, having an arm projecting radially inwardly and an arm projecting toward the cover and provided with a cam surface, a yieldable abutment ring of spring steel rod, circular in cross-section on the cover, adapted to be engaged by said cam surface for moving the pressure plate into clutching engagement with the driven element, said ring having an abutment region of varying axial height with respect to its general plane and being adjustable circumferentially to present varying portions of said region for engagement by said cam surface.

2. In a friction clutch, a driving element, a reaction member attached thereto, a pressure plate, a driven element arranged to be engaged between the driving element and the pressure plate, a bell crank lever pivoted on the pressure plate, having an arm projecting radially inwardly and an arm projecting toward the reaction member and provided with a cam surface, a yieldable abutment ring of spring steel rod carried by the reaction member, said rod presenting an abutment surface that is convex in cross section and of varying axial height circumferentially, said abutment surface being adapted to be engaged by said cam surface for moving the pressure plate into clutching engagement with the driven element and said abutment ring being adjustable circumferentially on the reaction member so as to present varying portions of said abutment surface for engagement by said cam surface.

3. In a friction clutch including friction clutching elements relatively movable axially with respect to each other for effecting clutch engagement and disengagement, an abutment member carried by one of said elements, said abutment member comprising a ring of spring steel rod providing an abutment surface that is convex in cross section and of varying axial height circumferentially, and an operating lever fulcrumed on the other of said elements and adapted to engage said abutment surface for moving the pressure plate into clutching engagement with the driven element, said abutment ring being adjustable circumferentially with reference to said one element so as to present different portions of said abutment surface for engagement by said lever.

4. In a friction clutch including friction clutching elements relatively movable axially with respect to each other for effecting clutch engagement and disengagement, an abutment member carried by one of said elements, said abutment member comprising a ring of spring steel rod, circular in cross section, presenting an abutment surface varying in axial height circumferentially, and an operating lever fulcrumed on the other of said elements and adapted to engage said abutment surface for moving the pressure plate into clutching engagement with the driven element, said abutment ring being adjustable circumferentially with reference to said one element so as to present different portions of said abutment surface for engagement by said lever.

5. In a friction clutch including friction clutching elements relatively movable axially with respect to each other for effecting clutch engagement and disengagement, an abutment member carried by one of said elements, said member having an abutment region of varying height with respect to its general plane, and an operating member fulcrumed on the other of said elements and having a cam surface adapted, when said operating member is moved about its fulcrum, to coact with said abutment region so as to cause relative axial movement of said clutching elements, said abutment member being adjustable circumferentially with relation to said operating member so as to present different portions of said abutment region for engagement by said cam surface, said abutment region being of spring metal and having limited axial yielding movement under the pressure of said operating member, said cam surface being arcuate in circumferential cross-section so as to adapt itself to any portion of said abutment region.

6. In a friction clutch including friction clutching elements relatively movable axially with respect to each other for effecting clutch engagement and disengagement, an abutment member carried by one of said elements, an operating lever fulcrumed on the other of said elements, and a barrel-shaped roller journalled on said lever and adapted, when said operating lever is moved about its fulcrum, to coact with said abutment member so as to cause relative axial movement of said clutching elements, said abutment member having an abutment region of varying axial height with respect to its general plane and being adjustable circumferentially to present varying portions of said region for engagement by said roller, said abutment region being formed of spring metal and arranged for limited axial yielding movement under pressure of said operating member.

CARL A. RUESENBERG.